United States Patent
Sato et al.

(10) Patent No.: US 8,392,769 B2
(45) Date of Patent: Mar. 5, 2013

(54) STORAGE DEVICE, CIRCUIT BOARD, LIQUID RESERVOIR AND SYSTEM

(75) Inventors: Jun Sato, Shiojiri (JP); Shuichi Nakano, Shiojiri (JP); Noboru Asauchi, Yamagata (JP)

(73) Assignee: Seiko Epson Corporation, Tokyo (JP)

( * ) Notice: Subject to any disclaimer, the term of this patent is extended or adjusted under 35 U.S.C. 154(b) by 7 days.

(21) Appl. No.: 13/215,130

(22) Filed: Aug. 22, 2011

(65) Prior Publication Data

US 2012/0047410 A1 Feb. 23, 2012

(30) Foreign Application Priority Data

Aug. 23, 2010 (JP) ................................. 2010-186007

(51) Int. Cl.
*G11C 29/00* (2006.01)
(52) U.S. Cl. ........................................ 714/718; 711/154
(58) Field of Classification Search .................... 705/63; 711/119, 113, 162, 154; 714/118
See application file for complete search history.

(56) References Cited

U.S. PATENT DOCUMENTS

| | | | |
|---|---|---|---|
| 7,393,092 B2 | 7/2008 | Saruta et al. | |
| 8,214,595 B2 * | 7/2012 | Shimada | 711/119 |
| 8,225,044 B2 * | 7/2012 | Shimada | 711/119 |
| 8,244,642 B2 * | 8/2012 | Moore et al. | 705/63 |
| 2007/0050540 A1* | 3/2007 | Klein | 711/113 |
| 2008/0104344 A1* | 5/2008 | Shimozono et al. | 711/162 |

FOREIGN PATENT DOCUMENTS

| | | |
|---|---|---|
| EP | 1 898 424 A1 | 3/2008 |
| WO | WO 2006/129779 A1 | 12/2006 |

* cited by examiner

*Primary Examiner* — David Ton
(74) *Attorney, Agent, or Firm* — Kilpatrick Townsend & Stockton LLP

(57) ABSTRACT

A storage device according to some aspects of the invention includes a communication unit configured to perform processing for communication with a host apparatus; a storage unit configured to have a first memory area and a second memory area that store therein received data from the host apparatus, and memory area selection information; a memory control unit configured to select one of the first memory area and the second memory area as a memory area for reading, select the other one thereof as a memory area for writing, and perform control of reading and writing; and an increment determination unit configured to compare a value of data having been read out from the memory area for reading by the memory control unit and a value of the received data to determine a magnitude relation therebetween.

20 Claims, 12 Drawing Sheets

FIG. 2A

| BLOCK | MA1 | | | MA2 | | |
|---|---|---|---|---|---|---|
| | DATA | SELECTION INFORMATION | FOR VERIFICATION | DATA | SELECTION INFORMATION | FOR VERIFICATION |
| | 16bits | 1bit | 1bit | 16bits | 1bit | 1bit |
| BLK1 | D[15:0] | ASB1-1 | P(Odd) | D[15:0] | ASB1-2 | P(Odd) |
| ⋮ | ⋮ | ⋮ | ⋮ | ⋮ | ⋮ | ⋮ |
| BLK32 | D[15:0] | ASB32-1 | P(Odd) | D[15:0] | ASB32-2 | P(Odd) |

FIG. 2B

| BLOCK | MA1 | | | MA2 | | |
|---|---|---|---|---|---|---|
| | DATA | SELECTION INFORMATION | FOR VERIFICATION | DATA | SELECTION INFORMATION | FOR VERIFICATION |
| | 15bits | 1bit | 1bit | 15bits | 1bit | 1bit |
| BLK1 | D[15:1] | ASB1-1 | P(Even) | D[15:1] | ASB1-2 | P(Even) |
| ⋮ | ⋮ | ⋮ | ⋮ | ⋮ | ⋮ | ⋮ |
| BLK32 | D[15:1] | ASB32-1 | P(Even) | D[15:1] | ASB32-2 | P(Even) |

FIG. 3A

| RESULT OF ERROR DETECTION | | SELECTED MEMORY AREA | |
|---|---|---|---|
| MA1 | MA2 | FOR WRITING | FOR READING |
| OK | OK | SELECTED IN ACCORDANCE WITH ASB | SELECTED IN ACCORDANCE WITH ASB |
| OK | NG | MA2 | MA1 |
| NG | OK | MA1 | MA2 |
| NG | NG | NOT SELECTED | NOT SELECTED |

FIG. 3B

| SELECTION INFORMATION | | SELECTED MEMORY AREA | |
|---|---|---|---|
| ASB-1 | ASB-2 | FOR WRITING | FOR READING |
| 0 | 0 | MA1 | MA2 |
| 1 | 0 | MA2 | MA1 |
| 1 | 1 | MA1 | MA2 |
| 0 | 1 | MA2 | MA1 |
| 0 | 0 | MA1 | MA2 |

FIG. 3C

| RESULT OF ERROR DETECTION | | MEMORY AREA FOR WRITING | BEFORE WRITING | | AFTER WRITING | |
|---|---|---|---|---|---|---|
| MA1 | MA2 | | ASB-1 | ASB-2 | ASB-1 | ASB-2 |
| NG | OK | MA1 | 0 | 0 | 1 | 0 |
| | | | 1 | 0 | 1 | 0 |
| | | | 1 | 1 | 0 | 1 |
| | | | 0 | 1 | 0 | 1 |
| OK | NG | MA2 | 0 | 0 | 0 | 0 |
| | | | 1 | 0 | 1 | 1 |
| | | | 1 | 1 | 1 | 1 |
| | | | 0 | 1 | 0 | 0 |

STORAGE DEVICE, CIRCUIT BOARD, LIQUID RESERVOIR AND SYSTEM

BACKGROUND

1. Technical Field

The present invention relates to a storage device, a circuit board, a liquid reservoir, a system and the like.

2. Related Art

Ink cartridges (liquid reservoirs) used for printers each employing an ink jet method are sometimes provided with storage devices. Such a storage device stores therein various kinds of information, such as a color of ink and an amount of consumed ink. Pieces of data relating to the amount of consumed ink are transmitted from a printer body (a host apparatus) to the storage device, and are written into nonvolatile memory modules or the like included in the storage device. Meanwhile, in general, such an ink cartridge is structured to be replaceable, and thus, has a high probability of occurrence of any loose contact in electrical contact portions thereof. Furthermore, occurrence of any communication error due to the loose contact is likely to cause writing of erroneous data thereinto.

Regarding such a problem described above, in WO 2006/129779, a method for prevention of writing data having a value contrary to an increasing or decreasing characteristic of the data to be written has been disclosed. However, this method has some disadvantages, such as a disadvantage in that, after a significantly large value (or a significantly small value) has been written owing to any memory error or the like, it is difficult to write correct data during a next access to the storage device.

SUMMARY

An advantage of some aspects of the invention is to provide a storage device, a circuit board, a liquid reservoir, a system and the like, which enable writing of correct data even when any error has occurred in stored data.

A first aspect of the invention is directed a storage device including a communication unit configured to perform processing for communication with a host apparatus; a storage unit configured to have a first memory area and a second memory area that store therein received data from the host apparatus, and memory area selection information; a memory control unit configured to select one of the first memory area and the second memory area as a memory area for reading, select the other one thereof as a memory area for writing, and perform control of reading and writing; and an increment determination unit configured to compare a value of data having been read out from the memory area for reading by the memory control unit and a value of the received data to determine a magnitude relation therebetween. Further, on the basis of a result of the determination made by the increment determination unit, the memory control unit decides to or not to write the received data into the memory area for writing.

According to the first aspect of the invention, by comparing a value of data having been read out from the memory area for reading and a value of the received data to determine a magnitude relation therebetween, it is possible to determine whether it is to be executed, or not, to write the received data into the memory area for writing. In this manner, it is possible to reduce probability of writing erroneous data, and the like, when storing data whose value monotonically increases, such as an amount of consumed ink. Consequently, it is possible to increase reliability of the storage device, and the like.

Further, in the first aspect, the storage device may further include an error verification unit configured to determine whether any error has been detected in each of two blocks of data, or not, one being a block of data having been written into the first memory area, the other one being a block of data having been written into the second memory area. Further, in the case where it is determined by the error verification unit that the error has not been detected in each of the two blocks of data, the memory selection unit may select the memory area for reading and the memory area for writing on the basis of the memory area selection information; while, in the case where it is determined by the error verification unit that the error has been detected in one of the two blocks of data, the memory control unit may select one of the first memory area and the second memory, in which the error has been detected, as the memory area for writing, and may select the other one thereof, in which the error has not been detected, as the memory area for reading.

In this manner, in the case where any error has been detected in one of the two memory areas, by reading out data from the other one of the two memory areas, in which no error has been detected, comparing a value of the read-out data and a value of new data having been received to obtain a magnitude relation therebetween, and determining whether the magnitude relation satisfies an increment condition, it is possible to write new data into the one of the two memory areas, in which any error has been detected. By employing this method, even in the case where a value of stored data becomes a significantly large value owing to any memory error, it is possible to write correct data during a next memory area access. Consequently, it is possible to increase reliability of the storage device, and the like.

Further, in the first aspect, the memory control unit may update the memory area selection information when writing the received data into the memory area for writing.

In this manner, it is possible to perform setting of the memory area selection information so that, during a next memory area access, the memory area into which correct data has been written can be selected as a memory area for reading. By employing this method, it is possible to read out correct data during a next memory area access. Consequently, it is possible to increase reliability of the storage device, and the like.

Further, in the first aspect, the communication unit may transmit an error notification to the host apparatus in the case where any error has been detected in each of the first memory area and the second memory area.

In this manner, the host apparatus can recognize that any error has been detected in each of the two memory areas. Consequently, since, subsequently, the host apparatus can perform appropriate processing, it is possible to increase reliability of the system.

Further, in the first aspect, the communication unit may transmit a completion notification to the host apparatus when writing of the received data from the host apparatus has been completed.

In this manner, the host apparatus can recognize that the writing of received data has been successfully completed by the storage device, and thus, the host apparatus, subsequently, can perform, for example, a process of transmitting the following block of to-be-written data. Further, if the completion notification has not been received, the host apparatus can perform an appropriate process, such as a process of retransmitting to-be-written data. Consequently, it is possible to A second aspect of the invention is directed to a circuit board including the foregoing storage device according to the first aspect or any one of the foregoing storage devices associated with the first aspect.

A third aspect of the invention is directed to a liquid reservoir including the foregoing storage device according to the first aspect or any one of the foregoing storage devices associated with the first aspect.

A fourth aspect of the invention is directed to a system including the foregoing storage device according to the first aspect or any one of the foregoing storage devices associated with the first aspect, and the host apparatus.

BRIEF DESCRIPTION OF THE DRAWINGS

The invention will be described with reference to the accompanying drawings, wherein like numbers reference like elements.

FIGS. 2A and 2B are diagrams each illustrating an example of a detailed configuration of first and second memory areas according to an embodiment of the invention.

FIGS. 3A, 3B and 3C are diagrams illustrating a memory area selection process performed by a memory control unit according to an embodiment of the invention.

DESCRIPTION OF EXEMPLARY EMBODIMENTS

Hereinafter, a preferred embodiment according to the invention will be described in detail. In addition, this embodiment described hereinafter does not unreasonably limit the content of the invention set forth in the appended claims, and further, all configurations described in this embodiment are not essential to means for solving problems, according to the invention.

1. Storage Device

Figure 1:
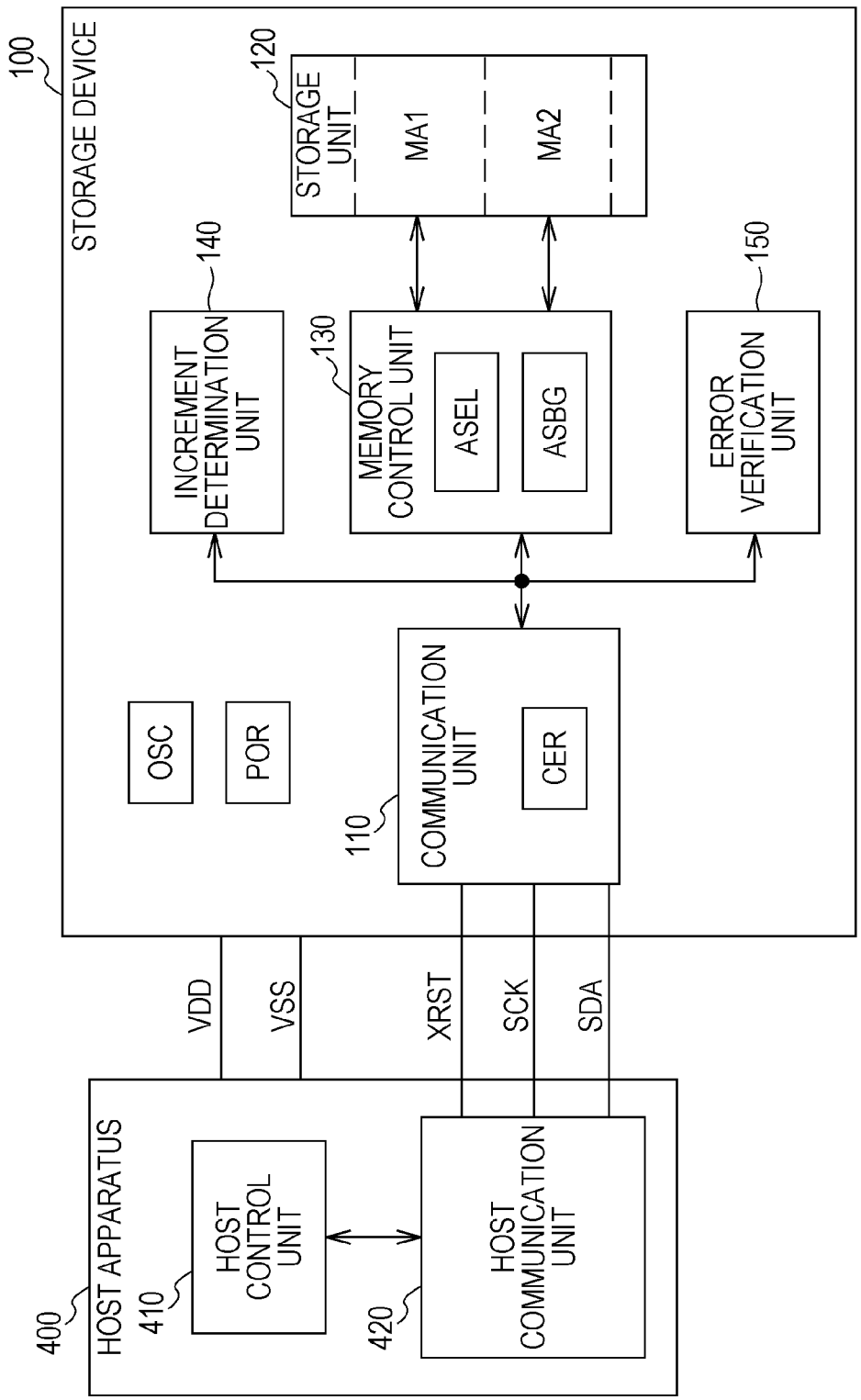
FIG. 1 is a diagram illustrating an example of a basic configuration of a storage device according to an embodiment of the invention.

Referring to FIG. 1, which is a diagram illustrating an example of a basic configuration of a storage device 100 according to this embodiment, the storage device 100 includes a communication unit 110, a storage unit 120, a memory control unit 130, an increment determination unit 140, an error verification unit 150, an oscillation circuit OSC, and a power-on reset circuit POR. In addition, the storage device 100 according to this embodiment is not limited to the configuration shown in FIG. 1, but, various modifications, such as omission of a part of configuration elements, replacement by other configuration elements and addition of other configuration elements, can be made.

The storage device 100 according to this embodiment is a storage device included in an ink cartridge (a liquid reservoir) used for, for example, a printer employing an ink jet method, and stores therein information, such as a piece of information relating to an amount of consumed ink, having been transmitted from a printer body (a host apparatus). In general, the ink cartridge (the liquid reservoir) is structured to be replaceable, and thus, any loose contact in connection portions for performing electrical connection between the printer body and the storage device is very likely to occur. Therefore, communication errors due to any loose contact in data signal terminals or write errors due to any loose contact in electric power supply terminals during data writing operations are likely to occur. In this regard, even when such errors have occurred, the storage device 100 according to this embodiment enables writing of correct data, as will be described hereinafter.

The communication unit 110 includes a communication error detection unit CER, and performs processing for communication with a host apparatus 400. Specifically, the communication unit 110 transmits and receives a data signal SDA to/from a host communication unit 420 included in the host apparatus 400. Further, the communication unit 110 receives a reset signal XRST and a clock signal SCK from the host apparatus 400. The communication error detection unit CER detects whether any communication error exists in received data, or not. This communication error detection can be performed by employing, for example, a parity check method.

The storage unit 120 is, for example, a nonvolatile memory module, such as a flash memory module or a ferroelectric memory module, and includes first and second memory areas MA1 and MA2. The first and second memory areas MA1 and MA2 each store therein received data from the host apparatus and memory area selection information ASB. This received data includes, for example, an amount of consumed ink relating to an ink cartridge for a printer, and the like. In addition, a detailed configuration of the first and second memory areas MA1 and MA2, as well as a detailed configuration of the memory area selection information, will be described hereinafter.

The memory control unit 130 includes a memory area selection unit ASEL for performing selection of one of the first and second memory areas MA1 and MA2 as a memory area for reading and the other one thereof as a memory area for writing, and performs control of a data reading process and a data writing process. Specifically, the memory area selection unit ASEL selects one of the first and second memory areas MA1 and MA2 as a memory area for reading, and selects the other one thereof as a memory area for writing, on the basis of the result of verification performed by the error verification unit 150, and the memory area selection information described hereinafter. Further, the memory control unit 130 includes a memory area selection information generating unit ASBG. This memory area selection information generating unit ASBG performs a process of updating the memory area selection information ASB when writing data into the memory area for writing. In addition, details of the memory area selection information ASB will be described hereinafter.

As will be described hereinafter, even when any error occurs in data stored in one of the two memory areas MA1 and MA2, the storage device 100 according to this embodiment enables writing of correct data having been received from the host apparatus 400 by selectively using the two memory areas MA1 and MA2. Consequently, for example, in a storage device for storing therein an amount of consumed ink (or an amount of remaining ink) associated with an ink cartridge (a liquid reservoir) included in a printer, even when stored data is in an abnormal condition, it is possible to write a correct amount of consumed ink (or a correct amount of remaining ink) having been received from the host apparatus 400.

The increment determination unit 140 compares a value of data having been read out by the memory control unit 130 from the memory area for reading and a value of received data to obtain a magnitude relation therebetween. The memory control unit 130 decides to or not to write the received data into the memory area for writing on the basis of a result of the determination having been made by the increment determination unit 140. This increment determination unit 140 is a unit for obtaining a magnitude relation between values of the two pieces of data, and determining whether the obtained magnitude relation satisfies an increment condition (or a decrement condition), or not. That is, the determination made by the increment determination unit 140 includes not only a determination regarding an increment condition, but also a determination regarding a decrement condition. The increment condition is a condition requiring that a value of data to be newly written is to be equal to or larger than a value of data having been written during a previous memory area access. Further, the decrement condition is a condition requiring that a value of data to be newly written is to be equal to or smaller than a value of data having been written during a previous memory area access.

In such a manner as described above, it is possible to write only data that satisfies an increment condition (or a decrement condition). For example, for a storage device used for storing monotonically increasing data therein (such as data relating to an amount of consumed ink), it is possible to make a determination to perform writing in the case where a value of received data is equal to or larger than a value of previously written data, and make a determination not to perform writing in the case where a value of received data is smaller than a value of previously written data. In contrast, for a storage device used for storing monotonically decreasing data therein (such as data relating to an amount of remaining ink), it is possible to make a determination to perform writing in the case where a value of received data is equal to or smaller than a value of previously written data, and make a determination not to perform writing in the case where a value of received data is larger than a value of previously written data. Consequently, even when any communication error or the like has occurred, it is possible to reduce probability of writing erroneous data.

The error verification unit 150 verifies whether any error exists in each of two blocks of data having been written in the first and second memory areas MA1 and MA2, or not. In this verification process, any error can be detected by employing a parity check method, a check sum method, or the like. On the basis of a result of the verification performed by the error verification unit 150, and the memory area selection information ASB, the memory control unit 130 selects one of the first and second memory areas MA1 and MA2 as a memory area for reading, and selects the other one thereof as a memory area for writing. In addition, a method for selecting memory areas will be described hereinafter.

The oscillation circuit OSC generates internal clocks for the storage device 100. Further, the power-on reset circuit POR is a circuit for releasing a reset condition when a voltage value of an electric power supply supplied to the storage device 100 has come to a predetermined voltage value.

The host apparatus 400 is, for example, a printer body, or the like, and includes a host control unit 410 and a host communication unit 420. The host control unit 410 performs control of print processing performed by a printer, processing for communicating with the storage device, processing for counting an amount of consumed ink, and the like. The host communication unit 420 performs processing for communicating with the storage device 100. Further, the host apparatus 400 supplies the storage device 100 with a first electric power supply (a low-voltage electric power supply) VSS and a second electric power supply (a high-voltage electric power supply) VDD.

FIGS. 2A and 2B are diagrams each illustrating an example of a detailed configuration of the first and second memory areas MA1 and MA2. In a configuration example shown in FIG. 2A, each of the memory areas MA1 and MA2 has a memory area of 32 blocks×18 bits, and each block of data includes data D [15:0] of 16 bits, memory area selection information ASB of 1 bit, and an error checking bit (a party bit) of 1 bit. In the case where the error verification unit 150 detects any error by employing the parity check method, the error checking bit is added so as to constantly make the number of "1" existing in each block of data be an even number or an odd number. Further, in a configuration example shown in FIG. 2B, each of the memory areas MA1 and MA2 has an memory area of 32 blocks×17 bits, and each block of data includes data D [15:1] of 15 bits, memory area selection information ASB of 1 bit, and an error checking bit (a party bit) of 1 bit. In addition, the memory areas MA1 and MA2 according to this embodiment are not limited to the configurations shown in FIGS. 2A and 2B, but, various modifications, such as omission of a part of configuration elements, replacement by other configuration elements, and addition of other configuration elements, can be made.

Further, communication between the host apparatus 400 and the storage device 100, and writing and reading of data into/from the memory areas MA1 and MA2 are performed on a block-by-block basis. Moreover, selection of the memory areas performed by the memory control unit 130 and error detection performed by the error verification unit 150 are also performed on a block-by-block basis. Therefore, the memory area selection information ASB is set for each block of data, and, for example, memory area selection information ASB1-1 and memory area selection information ASB1-2 are written into the first and second memory areas MA1 and MA2 included in a first block of data BLK1, respectively.

FIGS. 3A, 3B and 3C are diagrams illustrating a memory area selection process performed by the memory control unit 130. Before performing the memory selection process, for each of blocks of data included in the first and second memory areas MA1 and MA2, the error verification unit 150 detects whether any error exists in the block of data and the memory area selection information, or not, by using the checking bit. As shown in FIG. 3A, the memory control unit 130 performs selection of the memory area for writing and the memory area for reading on the basis of the result of the error detection regarding the memory areas MA1 and MA2 having been performed by the error verification unit 150. That is, as a first one of the results of the error detection, in the case where no error has been detected in each of the first and second memory areas MA1 and MA2 (i.e., in the case where both of MA1 and MA2 are "OK"), the memory control unit 130 performs selection of the memory area for writing and the memory area for reading on the basis of the memory area selection information ASB. Further, as second and third ones of the results of the error detection, in the case where any error has been detected in one of MA1 and MA2 (i.e., in the case where one of MA1 and MA2 is "NG"), and further, no error has been detected in the other one thereof (i.e., in the case where the other one of MA1 and MA2 is "OK"), the memory control unit 130 selects the one of MA1 and MA2 as the memory area for writing, and selects the other one of MA1 and MA2 as the memory area for reading. Further, in the case where any error has been detected in each of MA1 and MA2 (i.e., in the case where both of MA1 and MA2 are "NG"), the memory control unit 130 performs no selection of both of the memory area for writing and the memory area for reading.

Referring to FIG. 3B, which is a diagram used for description of a memory area selection process based on the memory area selection information ASB, in the case where no error has been detected in each of MA1 and MA2 (i.e., in the case where both of MA1 and MA2 are "OK"), as have been described with reference to FIG. 3A, the memory area for writing and the memory area for reading are selected on the basis of two pieces of memory area selection information ASB-1 and ASB-2. In addition, two pieces of the memory area selection information are written for each block of data, and thus, need to be denoted in a manner enabling identification of the block, such as ASB1-1 and ASB1-2, but, selection of the memory areas is performed within the same block, and thus, in the case where each block is not needed to be identified, the memory area selection information is denoted in the manner, such as ASB-1 and ASB-2.

For example, in the case where both of ASB-1 and ASB-2 are "0", the memory control unit 130 reads out data stored in MA2, and writes new data having been received from the host apparatus 400 into MA1. When writing new data into MA1, the memory control unit 130 updates the memory area selection information ASB-1 corresponding to MA1 from "0" to "1". In this manner, when writing new data next, the memory control unit 130 reads out data stored in MA1, and writes new data into MA2 because ASB-1 is "1" and ASB-2 is "0". When writing new data into MA2, the memory control unit 130 updates the memory area selection information ASB-2 corresponding to MA2 from "0" to "1". When writing new data next, the memory control unit 130 reads out data stored in MA2, and writes new data into MA1 because ASB-1 is "1" and ASB-2 is "1". When writing new data into MA1, the memory control unit 130 updates the memory area selection information ASB-1 corresponding to MA1 from "1" to "0".

As describe above, by following a selection rule shown in FIG. 3B, every time writing of new data is performed, it is possible to interchange MA1 and MA2 when selecting MA1 and MA2 as a memory area for wiring and a memory area for writing. Further, by causing the increment determination unit 140 to compare a value of read-out data and a value of new to-be-written data to determine a magnitude relation therebetween, it is possible to prevent writing of data that does not satisfy an increment condition.

Next, processing performed in the case where any error has been detected in one of MA1 and MA2; while no error has been detected in the other one of MA1 and MA2 will be described hereinafter. In this case, as shown in FIG. 3A, new data is written into the one of MA1 and MA2, in which any error has been detected. For example, in the case where no error has been detected in MA1; while any error has been detected in MA2, a value of data having been read out from MA1 and a value of new data to be written is compared with each other to determine a magnitude relation therebetween, and if the magnitude relation satisfies an increment condition, the new data is written into MA2.

Here, when new data is written into MA2, there are two options, one being to update the memory area selection information ASB-2 corresponding to MA2, the other one being not to update it. As shown in FIG. 3C, in the case where ASB-1 is "1" and ASB-2 is "0", ASB-2 is updated to "1". Further, in the case where ASB-1 is "0" and ASB-2 is "1", ASB-2 is updated to "0". In the other options other than these two options, ASB-2 is not updated. In this manner, after data has been written into MA2, the memory area selection information is brought to any one of two conditions, one being a condition in which ASB-1 is "0" and ASB-2 is "0", the other one being a condition in which ASB-1 is "1" and ASB-2 is "1". Therefore, during a next memory area access, it is possible to read out data from MA2 and write new data into MA1 in accordance with the selection rule shown in FIG. 3B.

Further, for example, in the case where any error has been detected in MA1, and no error has been detected in MA2, the memory control unit 130 reads out data from MA2, and compares a value of data having been read out from MA2 and a value of new data to be written to determine a magnitude relation therebetween, and writes the new data into MA1 if the magnitude relation satisfies an increment condition. When performing this writing process, by setting ASB-1 in such a manner as shown in FIG. 3C, it is possible to read out data from MA1 and write new data into MA2 in accordance with the selection rule shown in FIG. 3B during a next memory area access.

As described above, the storage device 100 according to this embodiment can be configured to, when any error has been detected in one of the two memory areas MA1 and MA2; read out data from the other one thereof in which no error has been detected; compare the read-out data and new data (received data) to obtain a magnitude relation therebetween; and determine whether the magnitude relation satisfies an increment condition, or not. Further, if it is determined that the magnitude relation satisfies the increment condition, as a result, the storage device 100 enables writing of the new data into the one of the memory areas MA1 and MA2, in which any error has been detected. In this manner, it is possible to write correct data during a next memory area access, even when a value of stored data (for example, an amount of consumed ink, or the like) becomes a significantly large value owing to any memory error. Consequently, applying such a storage device to, for example, an ink cartridge for a printer, enables reduction of defects, such as a defect that disables uses to use an ink cartridge although ink still remains therein.

For example, for flash memory modules or the like, sometimes, all of bits targeted for writing are set to "1" or "0" when electric power supply supplied thereto is shut down during an operation in which data is written thereinto. In this case as well, the storage device 100 according to this embodiment enables writing of correct data during a next access to the flash memory modules.

In addition, in the case where any error has been detected in each of the two memory areas, it is difficult to write correct data. However, a probability that any error is detected in each of the memory areas is sufficiently small, and thus, from a practical viewpoint, it can be considered that there is no problem.

Any other storage devices, each of which is not configured in such a manner as employed in this embodiment, can be also configured to prevent writing of erroneous data (significantly small data) by determining whether an increment condition is satisfied, or not. However, if a value of stored data varies to a significantly large value owing to any memory error, during a next access to memory modules, correct data cannot be written anymore. Consequently, some defects, such as a defect that disables users to use an ink cartridge although ink still remains therein, are likely to occur.

2. Control Flow

Figure 4:
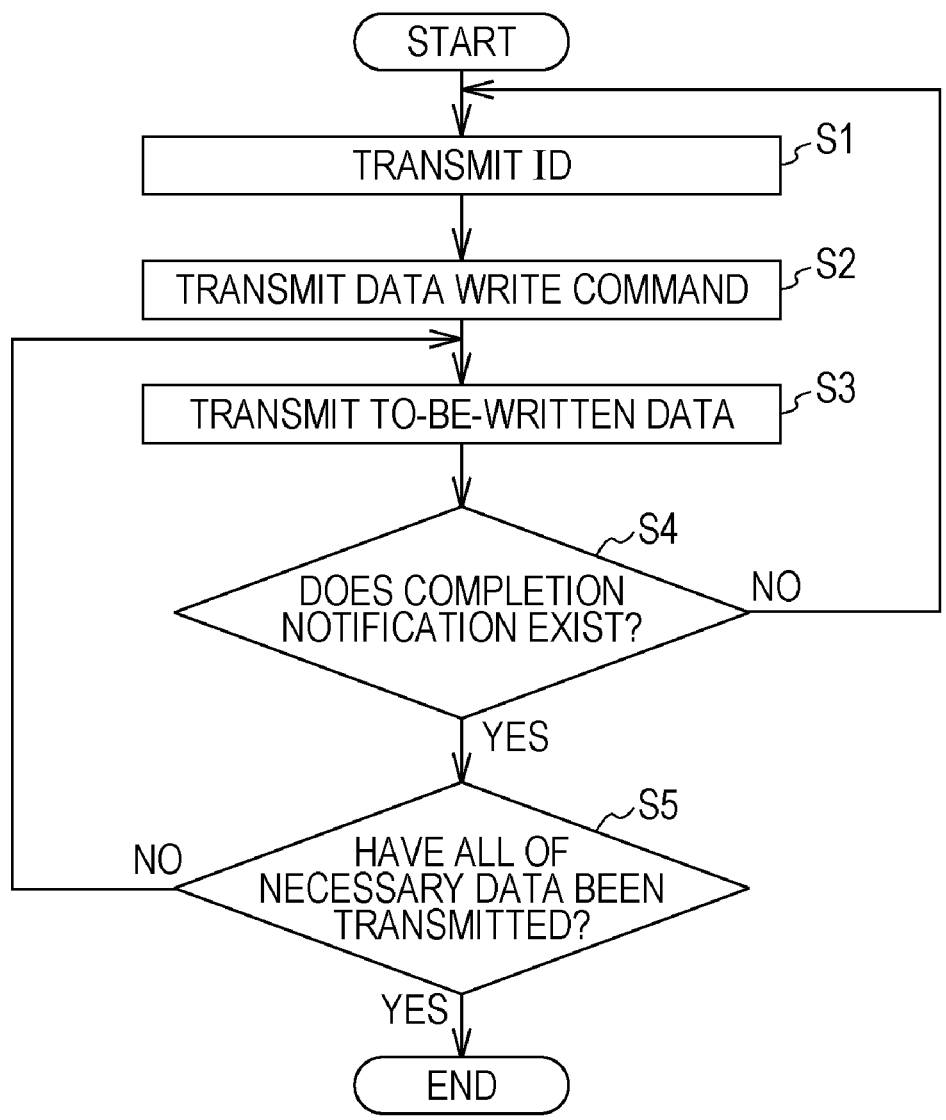
FIG. 4 is a flowchart illustrating control performed by a host apparatus, during a data writing process according to an embodiment of the invention.

FIG. 4 is a flowchart illustrating an example of a flowchart of control performed by the host apparatus 400 during a data writing process. Firstly, the host apparatus 400 transmits ID information (step S1). In the case where a plurality of storage devices is connected to the host apparatus 400, this ID information serves as identification of the storage devices. Next, the host apparatus 400 transmits a data write command (step S2), and subsequently, transmits to-be-written data (step S3). The to-be-written data is transmitted on a block-by-block basis, and when writing of the to-be-written data has been successfully completed, the storage device 100 transmits a completion notification (step S3). The host apparatus 400 determines whether this completion notification has been received, or not (step S4), and if it is determined that the completion notification has been received, the host apparatus 400 further determines whether transmission of necessary data has been completed, or not (step S5). If it is determined that the transmission of necessary data has not yet been completed, the process flow returns to step S3, where the host apparatus 400 transmits the following block of data. Further, when transmission of necessary data has been completed, this data writing process terminates. In contrast, if it is determined in step S4 that no completion notification has not been received, the process flow returns to step S1, where the host apparatus 400 executes the data writing process again.

Figure 5:
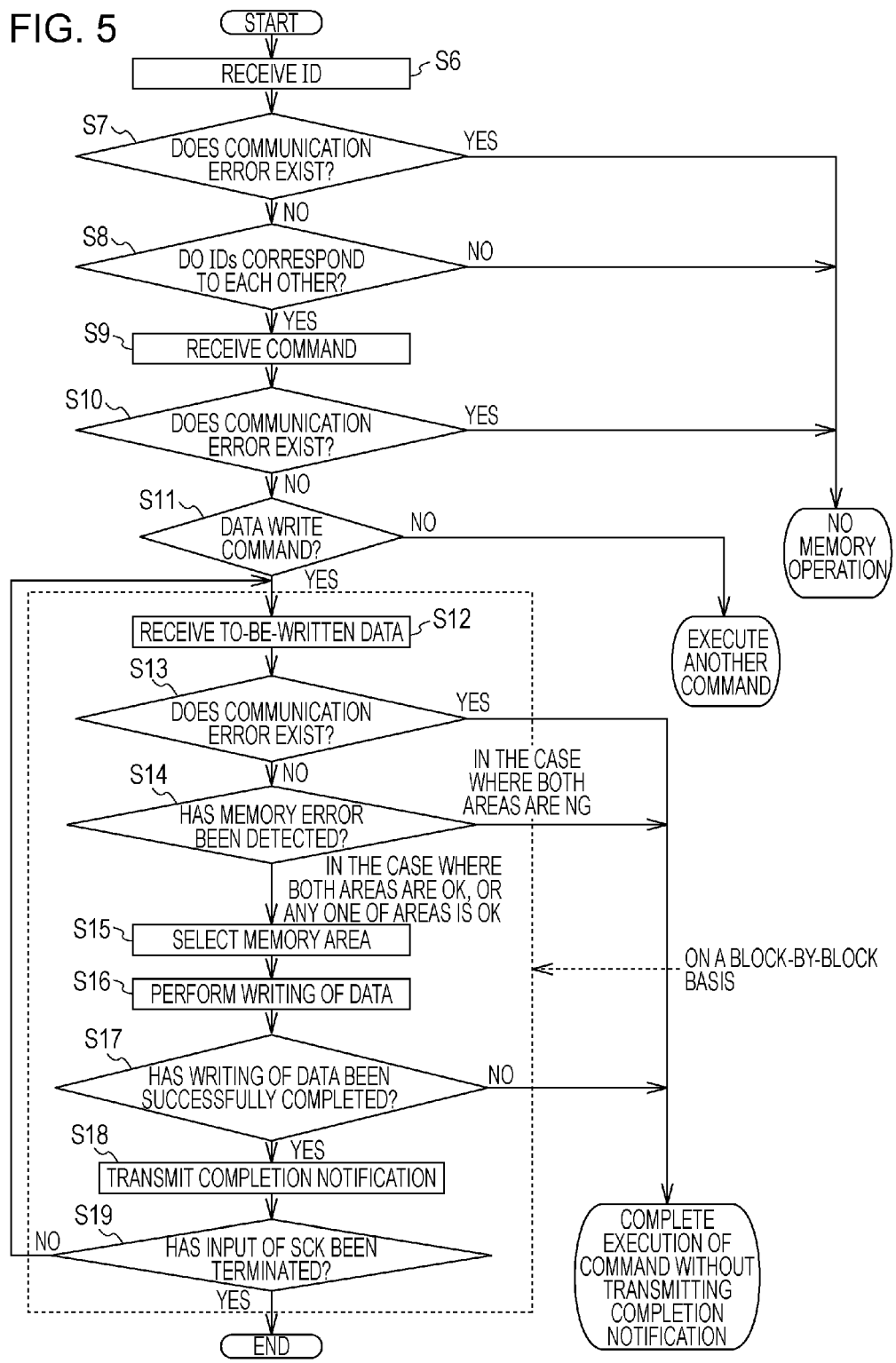
FIG. 5 is a flowchart illustrating control performed by a storage device during a data writing process, according to an embodiment of the invention.

FIG. 5 is a flowchart illustrating an example of a flowchart of control performed by the storage device 100 during a data writing process. Firstly, the communication unit 110 of the storage device 100 receives ID information (step S6), and the communication error detection unit CER determines whether any communication error exists, or not (step S7). If it is determined that no communication error exists, the communication unit 110 determines whether the received ID information and ID information, which has been given to the storage device 100 in advance, correspond to each other, or not (step S8), and if it is determined that the two IDs correspond to each other, the communication unit 110 receives a command (step S9). Next, the communication error detection unit CER determines whether any communication error exists, or not (step S10), and if it is determined that no communication error exists, the communication unit 110 determines whether the received command is a data write command, or not (step S11). If the determination is that the received command is a data write command, the communication unit 110 receives to-be-written data (step S12), and if the determination is that the received command is not a data write command, the process flow branches into a process in which the received command is executed.

After having received the to-be-written data, the communication error detection unit CER determines whether any communication error exists, or not (step S13), and if it is determined that no communication error exists, the error verification unit 150 executes verification of memory modules (step S14). If, as a result of this verification, no error has been detected in each of or any one of the memory areas MA1 and MA2, the memory area selection unit ASEL performs a memory area selection process (step S15). In contrast, if any error has been detected in each of the memory areas MA1 and MA2, the data writing process terminates without transmitting the completion notification.

Figure 6:
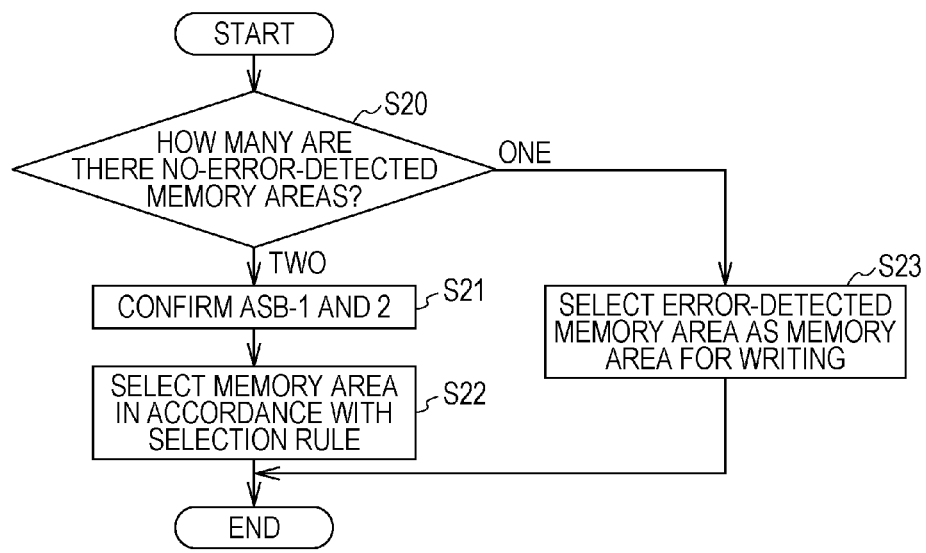
FIG. 6 is a flowchart illustrating details of a memory selection process during a data writing process, according to an embodiment of the invention.

FIG. 6 is a flowchart illustrating details of a memory area selection process (step S15) performed by the memory area selection unit ASEL. Firstly, the memory area selection unit ASEL causes the process flow to branch into two processes in accordance with the number of memory areas in each of which no error has been detected (step S20). If there are two memory areas, in each of which no error has been detected, the memory area selection unit ASEL confirms the pieces of memory area selection information ASB-1 and ASB-2 (step S21), and performs selection of a memory area for writing and a memory area for reading in accordance with the selection rule shown in FIG. 3B (step S22). Further, if there is only one memory area, in which no error has been detected, as shown in FIG. 3A, the memory area selection unit ASEL selects one of memory areas, in which any error has been detected, as a memory area for writing, and selects the other one of memory areas, in which no error has been detected, as a memory area for reading (step S23). After completion of the memory area selection process, the memory control unit 130 performs a process of writing data (step S16).

Figure 7:
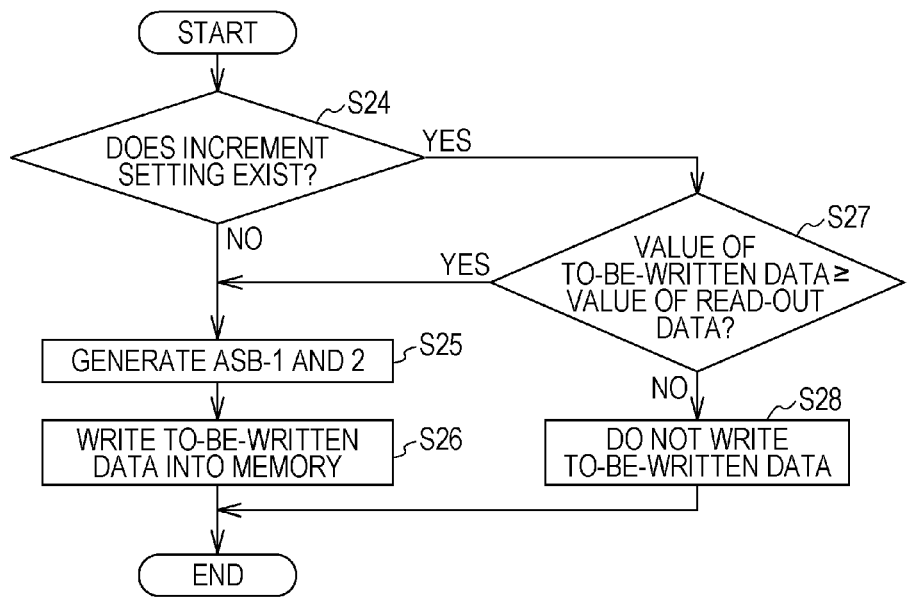
FIG. 7 is a flowchart illustrating details of data write processing according to an embodiment of the invention.

FIG. 7 is a flowchart illustrating details of the process of writing data (step S16) performed by the increment determination unit 140 and the memory control unit 130. Firstly, the increment determination unit 140 determines whether an increment setting exists, or not (step S24). If the determination is that the increment setting exists, the increment determination unit 140 compares a value of to-be-written data and a value of read-out data to obtain a magnitude relation therebetween, and determines whether the magnitude relation satisfies an increment condition, or not (step S27). If it is determined that the magnitude relation satisfies the increment condition, the memory area selection information generating unit ASBG generates the memory area selection information ASB-1 (or ASB-2) (step S25), and the memory control unit 130 writes the to-be-written data and the memory area selection information ASB-1 (or ASB-2) into a memory area having been selected as the memory area for writing (step S26). In contrast, if it is determined that the magnitude relation does not satisfy the increment condition, the memory control unit 130 does not write the to-be-written data (step S28).

When the process of writing data has been successfully completed (step S17), the communication unit 110 transmits a completion notification to the host apparatus 400 (step S18). This completion notification is transmitted by, for example, outputting a H level signal (a high-voltage level signal) as the data signal SDA. Further, in the case where input of the clock signal SCK from the host apparatus 400 still exists (step S19), the process flow returns to step S12, where the communication unit 110 receives the following block of to-be-written data. In contrast, in the case where no input of the clock signal from the host apparatus 400 exists, the communication unit 110 determines that writing of all necessary blocks of data has been successfully completed (step S19), and terminates the data writing process. In addition, if the writing of all necessary blocks of data has not been successfully completed (step S17), the communication unit 110 terminates the data writing process without transmitting the completion notification.

Figure 8:
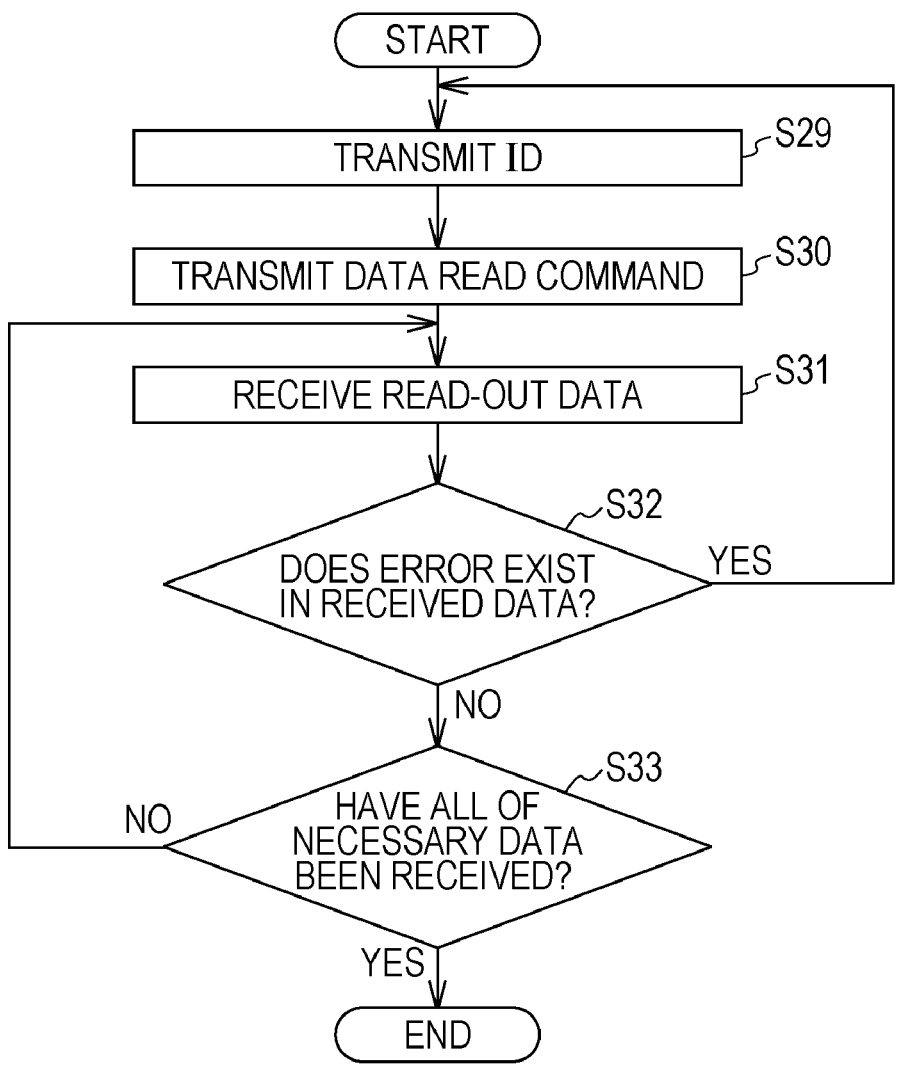
FIG. 8 is a flowchart illustrating control performed by a host apparatus during a data reading process, according to an embodiment of the invention.

FIG. 8 is a flowchart illustrating an example of control performed by the host apparatus 400 during a data reading process. Firstly, the host apparatus 400 transmits ID information (step S29). Next, the host apparatus 400 transmits a data read command (step S30), and subsequently, receives read-out data (step S31). The read-out data is received on a block-by-block basis just like in the case of transmission of to-be-written data. Further, the host apparatus 400 determines whether any error exists in the received data, or not (step S32), and if it is determined that no error exists in the received data, the host apparatus 400 determines whether all of necessary data have been successfully completed, or not (step S33). If it is determined that all of the necessary data have not yet been completed, the host apparatus 400 returns the process flow to step S31, and receives the following block of data. When all of the necessary data have been successfully completed, the host apparatus 400 terminates the data reading process. In contrast, in the case any error exists in the received data, the host apparatus 400 returns the process flow to step S29, and executes the data reading process again. In this case, the error includes any communication error, and any error code (i.e., any error notification) having been transmitted from the storage device 100.

Figure 9:
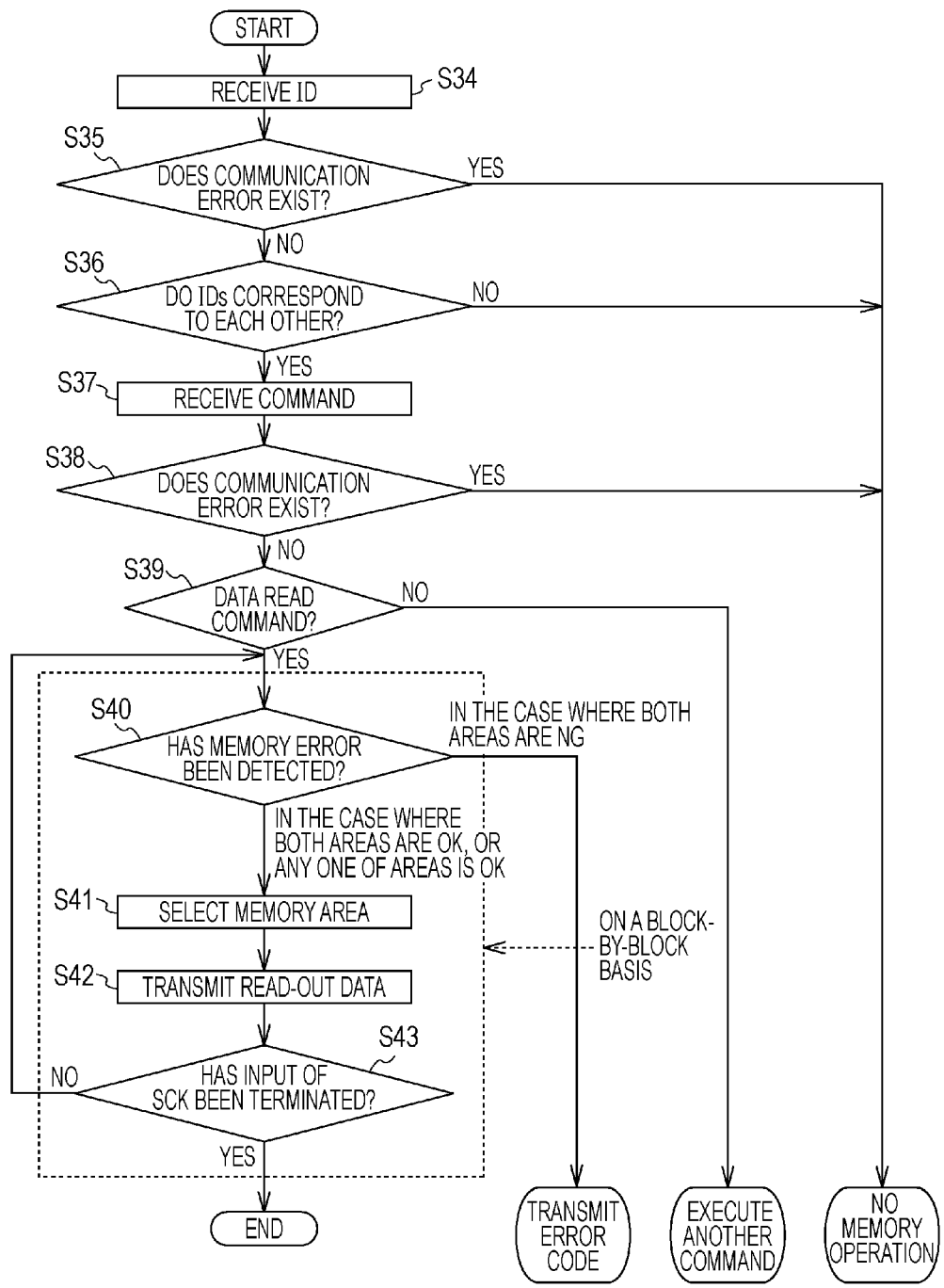
FIG. 9 is a flowchart illustrating control performed by a storage device during a data reading process, according to an embodiment of the invention.

FIG. 9 is a flowchart illustrating an example of control performed by the storage device 100 during a data reading process. Firstly, the communication unit 110 of the storage device 100 receives ID information (step S34), and the communication error detection unit CER determines whether any error exists in the received ID information, or not (step S35). If it is determined that no error exists in the received ID information, the communication unit 110 determines whether the received ID information and ID information that has been given to the storage device 100 in advance correspond to each other, or not (step S36), and if it is determined that the two pieces of ID information correspond to each other, the communication unit 110 receives a command (step S37). Next, the communication error detection unit CER determines whether any communication error exists in the received command, or not (step S38), and if it is determined that no communication error exists in the received command, the communication unit 110 determines whether the received command is a data read command, or not (step S39). If it is determined that the received command is the data read command, the memory control unit 130 reads out data from the memory areas MA1 and MA2, and the error verification unit 150 determines whether any error exists in each of the read-out data, or not (step S40). If it is determined that the received command is not the data read command, the process flow branches into a process where the received command is executed.

If no error has been detected in each of or any one of the memory areas MA1 and MA2, the memory area selection unit ASEL performs selection of memory areas (step S41). In contrast, if any error has been detected in each of the memory areas MA1 and MA2, the communication unit 110 transmits an error code (an error notification), and then, terminates the data reading process.

Figure 10:
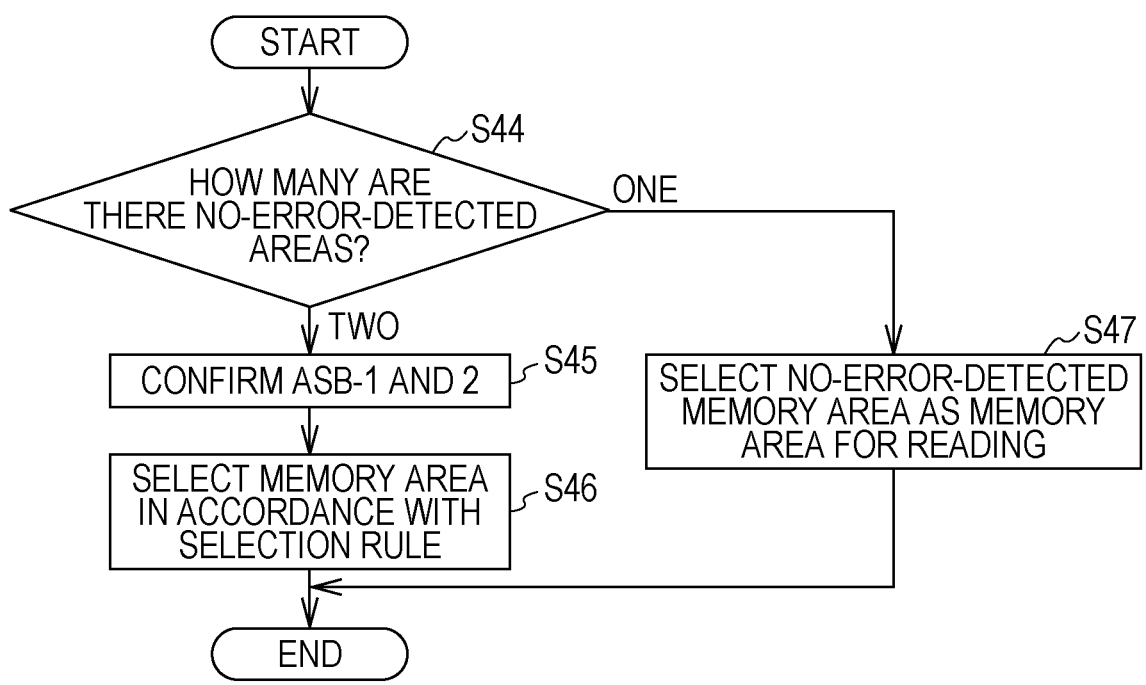
FIG. 10 is a flowchart illustrating details of a memory selection process during a data reading process, according to an embodiment of the invention.

FIG. 10 is a flowchart illustrating details of a memory area selection process (step S41) performed by the memory area selection unit ASEL. Firstly, the memory area selection unit ASEL causes the process flow to branch into two processes corresponding to the number of memory areas in which no error has been detected (step S44). If there are two memory areas, in each of which no error has been detected, the memory area selection unit ASEL confirms the two pieces of memory area selection information ASB-1 and ASB-2 (step S45), and selects a memory area for reading in accordance with the selection rule shown in FIG. 3B (step S46). Further, if there is only one memory area, in which no error has been detected, as shown in FIG. 3A, the memory area selection unit ASEL selects the memory area, in which no error has been detected, as a memory area for reading (step S47).

After completion of the memory area selection process, the communication unit 110 transmits data having been read out from the memory area for reading to the host apparatus 400 (step S42). Further, after the transmission of the read-out data, in the case where input of the clock signal SCK from the host apparatus 400 still exists (step S43), the process flow returns to step S40, where the communication unit 110 transmits the following block of read-out data. In contrast, in the case where no input of the clock signal from the host apparatus 400 exists, the communication unit 110 determines that reading out of all necessary blocks of data has been successfully completed (step S43), and terminates the data reading process.

Figure 11:
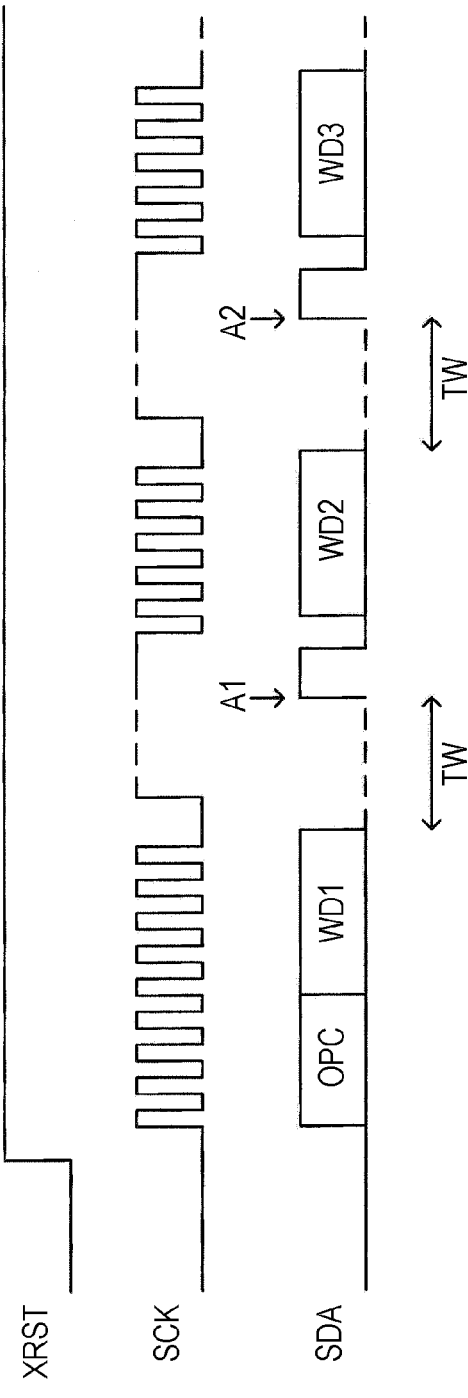
FIG. 11 is diagram illustrating an example of a timing chart for a data writing process, according to an embodiment of the invention.

FIG. 11 a diagram illustrating an example of a timing chart for a data writing process. Upon rise-up of the reset signal XRST to H level, a reset condition of the storage device 100 is released, and then, the data signal SDA is transmitted from the host apparatus 400 to the storage device 100 in synchronization with the clock signal SCK. Specifically, firstly, an operation code OPC is transmitted, and subsequently, a first block of to-be-written data WD1 is transmitted. This operation code OPC includes, for example, a piece of ID information and a write command.

Upon receipt of the first block of to-be-written data WD1, during a period TW shown in FIG. 11, the storage device 100 writes data into the memory area MA1 (or MA2) in accordance with the process flows shown in FIGS. 5 to 7. Further, upon completion of the writing of data, the storage device 100 transmits a completion notification to the host apparatus 400. Specifically, as denoted by A1 shown in FIG. 11, the completion notification is transmitted by setting the data signal SDA to H level. Next, the storage device 100 receives a second block of to-be-written data WD2, and writes the block of data WD2 into a memory area, and transmits a completion notification after completion of the writing of data (denoted by A2 shown in FIG. 11). Subsequently, the storage device 100 receives a third block of to-be-written data WD3, and performs the data writing process in the same manner as described above.

Figure 12:
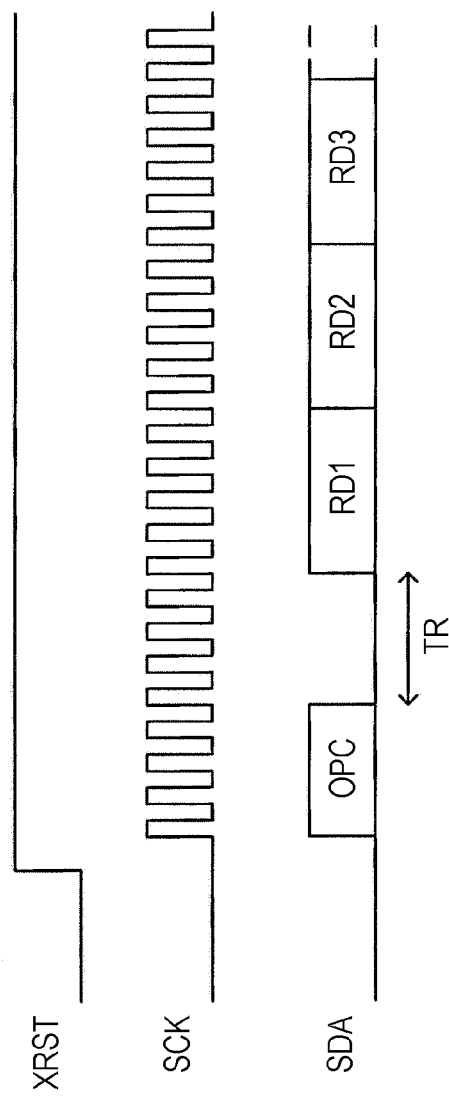
FIG. 12 is diagram illustrating an example of a timing chart for a data reading process, according to an embodiment of the invention.

FIG. 12 a diagram illustrating an example of a timing chart for a data reading process. Upon rise-up of the reset signal XRST to H level, a reset condition of the storage device 100 is released. Further, an operation code OPC is transmitted from the host apparatus 400 to the storage device 100. This operation code OPC includes, for example, a piece of ID information and a read command.

Upon receipt of the operation code OPC, during a period denoted by TR shown in FIG. 12, the storage device 100 reads out a first block of data from a memory area in accordance with the process flows shown in FIGS. 9 and 10. Further, the storage device 100 transmits the first block of read-out data RD1 to the host apparatus 400. Subsequently, the storage device 100 transmits a second block of read-out data RD2. It is possible to read out the second block of data RD2 from a memory area during a period of time while transmitting the first block of data, and thus, it is possible to transmit the second block of data RD2 without any breaks after completion of the transmission of the first block of data. Similarly, the storage device 100 transmits a third block of read-out data RD3.

3. System, Liquid Reservoir and Circuit Substrate

Figure 13:
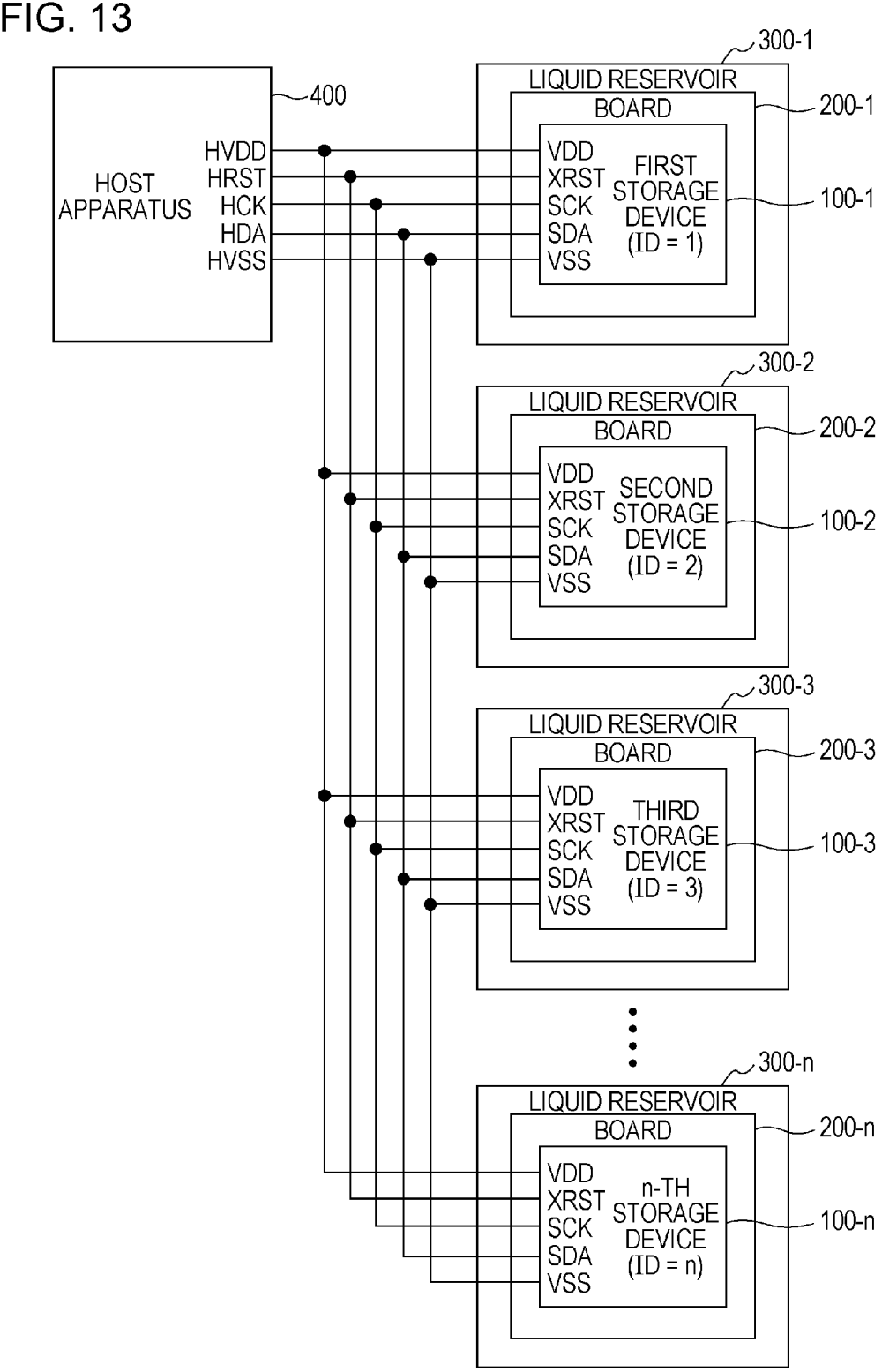
FIG. 13 is a diagram illustrating an example of a basic configuration of a system according to an embodiment of the invention.

Referring to FIG. 13, which shows an example of a basic configuration of a system according to this embodiment, a system according to this embodiment, such as a printer employing an ink jet method, includes a first storage device 100-1 to an n-th storage device 100-*n* (n is an integer greater than or equal to "2"), n circuit boards 200-1 to 200-*n* each having a storage device mounted thereon, n liquid reservoirs 300-1 to 300-*n* each including a circuit board thereon, and the host apparatus 400. In addition, the system according to this embodiment is not limited to the configuration shown in FIG. 13, but, various modifications, such as omission of a part of configuration elements, replacement by other configuration elements and addition of other configuration elements, can be made.

Hereinafter, an example, in which the host apparatus 400 is a printer employing an ink jet method, the liquid reservoir 300 is an ink cartridge, and the circuit board 200 is a circuit board included in the ink cartridge, will be described. In addition, the host apparatus, the liquid reservoir and the circuit board according to this embodiment may be an apparatus, a reservoir and a board that are different from those described above. For example, the host apparatus may be a reader/writer for a memory card, and the circuit board may be a circuit board included in the memory card.

The first storage device 100-1 to the n-th storage device 100-*n* each include a reset terminal XRST, a clock terminal SCK, a data terminal SDA, a first electric power supply terminal VSS, and a second electric power supply terminal VDD. These n storage devices 100-1 to 100-*n* each have a storage unit (for example, a unit including nonvolatile memory modules or the like), and further, each storage unit retains ID (identification) information (for example, ID=1, ID=2, ID=3, and the like) for identifying the n liquid reservoirs (for example, ink cartridges or the like). The IDs are uniquely given for respective attributes, such as colors of liquid included in respective liquid reservoirs.

The host apparatus 400 is, for example, a printer body, and includes a host side reset terminal HRST, a host side clock terminal HCK, a host side data terminal HDA, a first host side electric power supply terminal HVSS, and a second host side electric power supply terminal HVDD.

As described above, in the system according to this embodiment, it is possible to write new data during a next access to memory areas even when a value of data stored in the stored apparatus, such as an amount of consumed ink (or an amount of remaining ink), becomes a significantly large value owing to any memory error. Consequently, applying such a storage device to an ink cartridge for a printer, and the like, enables reduction of defects, such as a defect that disables uses to use an ink cartridge although ink still remains therein.

Figure 14:
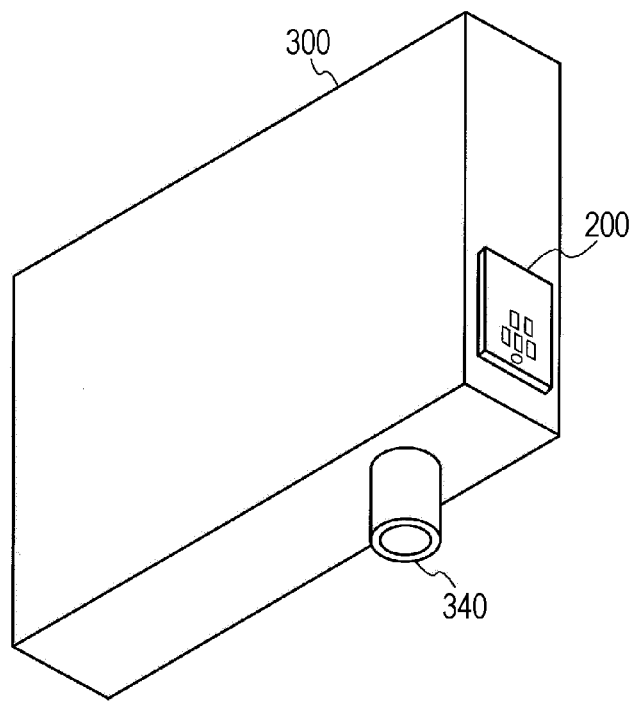
FIG. 14 is a diagram illustrating an example of a detailed configuration of a liquid reservoir according to an embodiment of the invention.

Referring to FIG. 14, which is a diagram illustrating details of a configuration of the liquid reservoir (ink cartridge) 300, an ink room (not shown) for storing ink therein is formed inside the liquid reservoir 300. Further, the liquid reservoir 300 is provided with an ink supply opening 340 connected to the ink room. This ink supply opening 340 serves as an opening for supplying a print head unit with ink under the condition where the liquid reservoir 300 is attached to the printer.

The liquid reservoir 300 includes the circuit board 200 thereon. The circuit board 200 is provided with the storage device 100 according to this embodiment, which stores data therein, such as an amount of consumed ink, and transmits and receives data to/from the host apparatus 400. The circuit board 200 is realized by, for example, a print circuit, and is mounted on the surface of the liquid reservoir 300. The circuit board 200 is provided with terminals, such as a second electric power supply terminal VDD. Further, upon attachment of the liquid reservoir 300 to the printer, these terminals are brought into contact with (electrical connection to) terminals at the printer side, via which electric power resource is supplied, and transmission and receipt of data is performed.

Figure 15A:
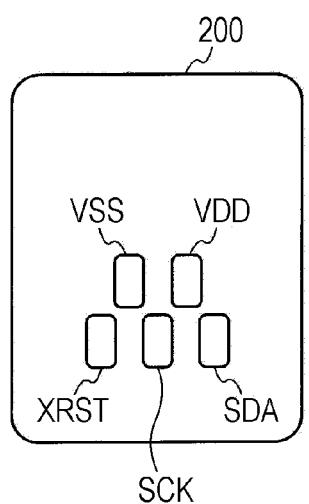
FIGS. 15A and 15B are diagrams illustrating an example of a detailed configuration of a circuit board according to an embodiment of the invention.
Figure 15B:
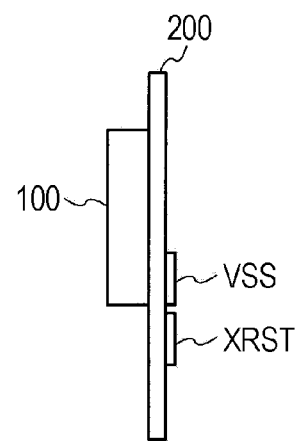

FIGS. 15A and 15B are diagrams each illustrating details of an example of a configuration of the circuit board 200 including the storage device 100 according to this embodiment. As shown in FIG. 15A, a group of a plurality of terminals is provided on the surface of the circuit board 200 (i.e., on the surface thereof to be connected to the printer). This group of terminals includes the first electric power supply VSS, the second electric power supply VDD, the reset terminal XRST, the clock terminal SCK and the data terminal SDA. Each of these terminals is realized by, for example, a metal terminal that is formed in a rectangular shape (in a substantially rectangular shape). Further, each of the terminals is connected to the storage device 100 via wiring pattern layers and throughholes (not shown) included in the circuit board 200.

As shown in FIG. 15B, the storage device 100 according to this embodiment is mounted on the rear surface (on the surface at the rear side of the side to be connected to the printer). The storage device 100 is realized by, for example, a semiconductor storage device including flash memory modules or ferroelectric memory modules. This storage device 100 stores therein various data relating to ink and the liquid reservoir 300, such as ID information for identifying the liquid reservoir 300 and an amount of consumed ink. The data relating to an amount of consumed ink is data associated with ink stored in the liquid reservoir 300, the data indicating a total amount of ink that has been consumed by execution of printing and the like. This data relating to an amount of consumed ink may be information indicating a current amount of ink included in the liquid reservoir 300, or may be information indicating a ratio of an amount of consumed ink relative to an amount of filled ink.

In addition, hereinbefore, this embodiment has been described in detail, and those skilled in the art will easily understand that lots of modifications that do not substantially depart from new particulars and effects of the invention can be made. Therefore, it should be noted that all of embodiments including such modifications are included within the scope of the invention. For example, any term, which is described at least once together with a comprehensive or synonymous different term in the specification document and the drawings, can be replaced by the different term in any parts of the specification document and the drawings. Moreover, any configurations and operations of a storage device, a circuit board, a liquid reservoir and a system according to aspects of the invention are also not limited to those having been described in this embodiment, but various modifications thereof can be made.

The entire disclosure of Japanese Patent Application No. 2010-186007, filed Aug. 23, 2010 is expressly incorporated by reference herein.

What is claimed is:

1. A storage device comprising:
 a communication unit configured to perform processing for communication with a host apparatus;
 a storage unit configured to have a first memory area and a second memory area that store therein received data from the host apparatus, and memory area selection information;
 a memory control unit configured to select one of the first memory area and the second memory area as a memory area for reading, select the other one thereof as a memory area for writing, and perform control of reading and writing; and
 an increment determination unit configured to compare a value of data having been read out from the memory area for reading by the memory control unit and a value of the received data to determine a magnitude relation therebetween, wherein, on the basis of a result of the determination made by the increment determination unit, the memory control unit decides to or not to write the received data into the memory area for writing.

2. The storage device according to claim 1 further comprising:

an error verification unit configured to determine whether any error has been detected in each of two blocks of data, or not, one being a block of data having been written into the first memory area, the other one being a block of data having been written into the second memory area, wherein, in the case where it is determined by the error verification unit that the error is not detected in each of the two blocks of data, the memory selection unit selects the memory area for reading and the memory area for writing on the basis of the memory area selection information, and wherein, in the case where it is determined by the error verification unit that the error is detected in one of the two blocks of data, the memory control unit selects one of the first memory area and the second memory, in which the error is detected, as the memory area for writing, and selects the other one thereof, in which the error is not detected, as the memory area for reading.

3. The storage device according to claim 2, wherein the memory control unit updates the memory area selection information when writing the received data into the memory area for writing.

4. A circuit board comprising the storage device according to claim 3.

5. A liquid reservoir comprising the storage device according to claim 3.

6. A system comprising the storage device according to claim 3, and the host apparatus.

7. The storage device according to claim 2, the communication unit transmits an error notification to the host apparatus in the case where any error is detected in each of the first memory area and the second memory area.

8. A circuit board comprising the storage device according to claim 7.

9. A liquid reservoir comprising the storage device according to claim 7.

10. A system comprising the storage device according to claim 7, and the host apparatus.

11. A circuit board comprising the storage device according to claim 2.

12. A liquid reservoir comprising the storage device according to claim 2.

13. A system comprising the storage device according to claim 2, and the host apparatus.

14. The storage device according to claim 1, the communication unit transmits a completion notification to the host apparatus when writing of the received data from the host apparatus is completed.

15. A circuit board comprising the storage device according to claim 14.

16. A liquid reservoir comprising the storage device according to claim 14.

17. A system comprising the storage device according to claim 14, and the host apparatus.

18. A circuit board comprising the storage device according to claim 1.

19. A liquid reservoir comprising the storage device according to claim 1.

20. A system comprising the storage device according to claim 1, and the host apparatus.

* * * * *